UNITED STATES PATENT OFFICE.

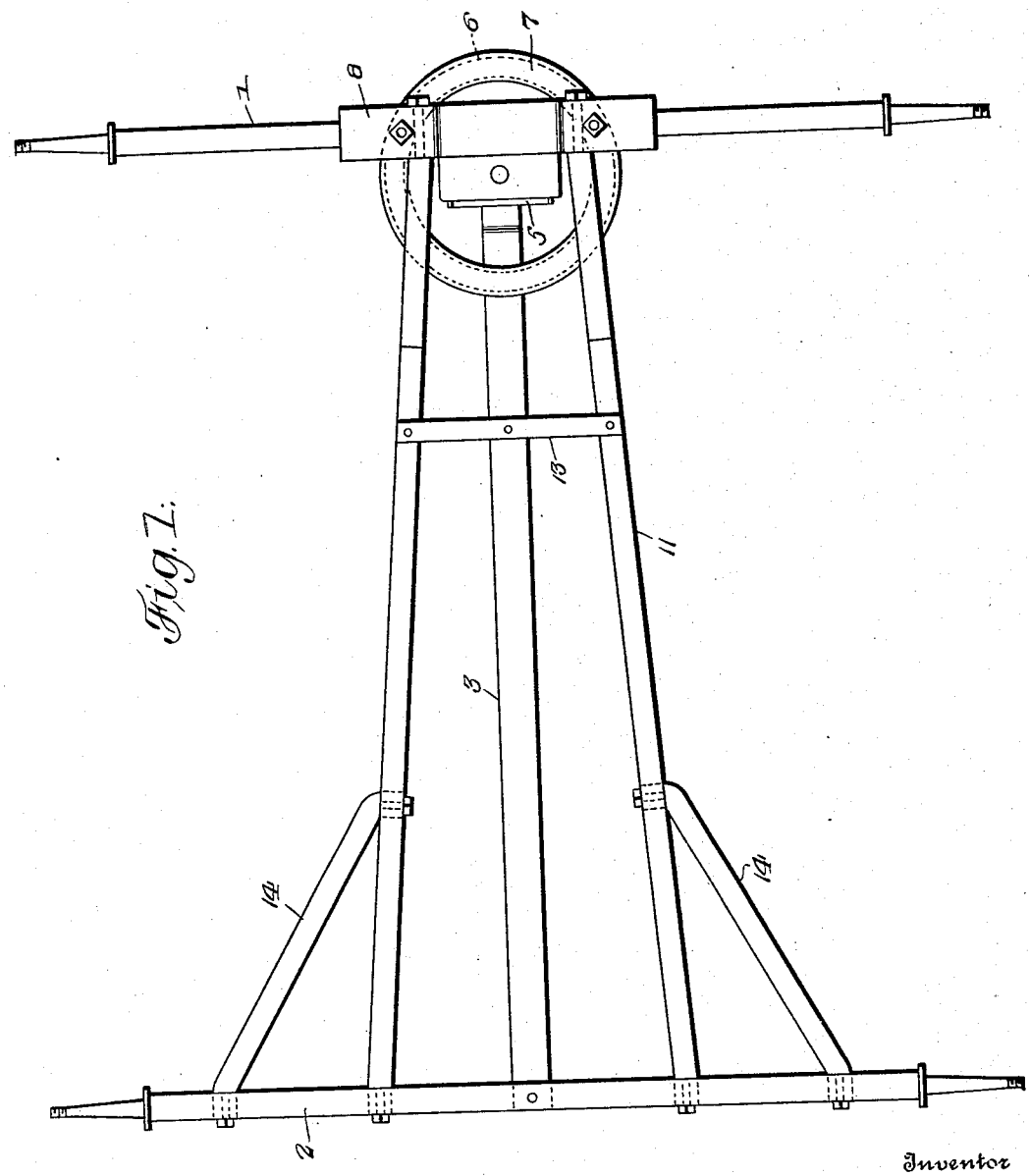

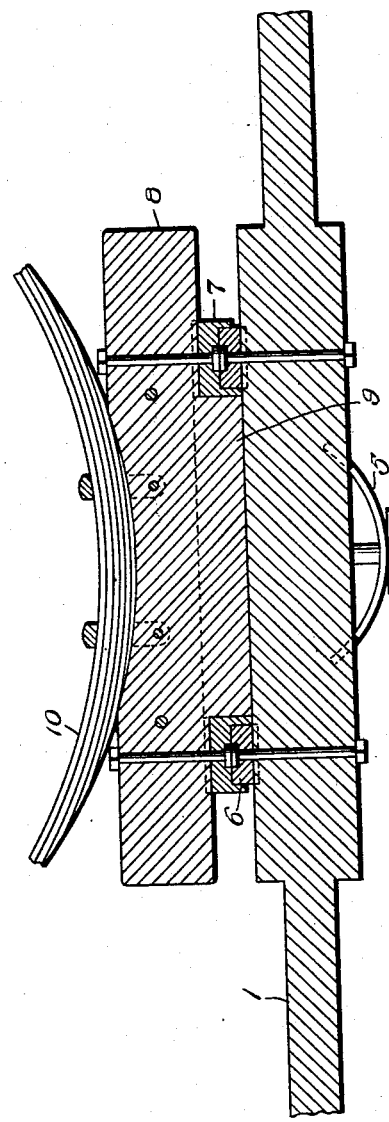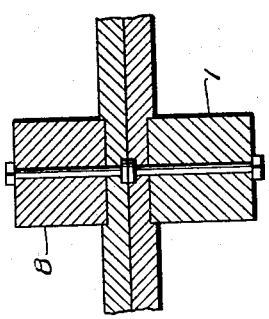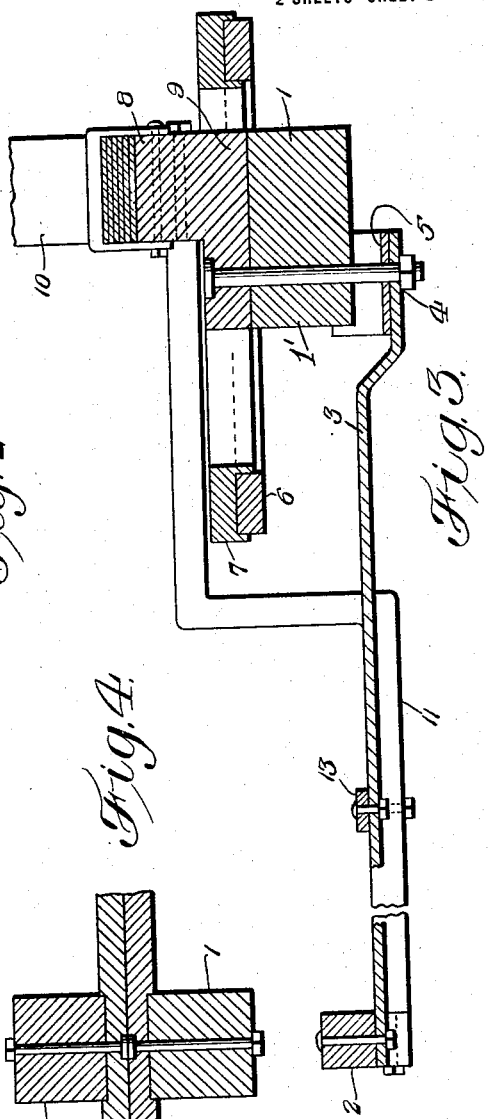

EUGENE MORRIS, JR., OF WESTPORT, TENNESSEE.

RUNNING-GEAR.

1,218,885.  Specification of Letters Patent.  Patented Mar. 13, 1917.

Application filed February 29, 1916. Serial No. 81,246.

*To all whom it may concern:*

Be it known that I, EUGENE MORRIS, Jr., a citizen of the United States, residing at Westport, in the county of Carroll and State of Tennessee, have invented new and useful Improvements in Running-Gears, of which the following is a specification.

This invention relates to running gears adapted to be used upon buggies or similar vehicles and it consists in the novel features hereinafter described and claimed.

An object of the invention is to provide a running gear of the character indicated which includes means for efficiently connecting the front and rear axles together and also includes a fifth wheel mechanism with means provided for protecting the fifth wheel against the accumulation of dust, dirt, etc.

In the accompanying drawings,

Figure 1 is a top plan view of the running gear.

Fig. 2 is a detailed transverse sectional view of the same.

Fig. 3 is a fragmentary longitudinal sectional view of the same.

Fig. 4 is a detailed sectional view through the front axle and bolster of the running gear.

The running gear includes a front axle 1 and a rear axle 2. These axles are of the usual configuration and may be straight or arched as desired. A reach pole 3 is connected at its rear end with the rear axle 2 at a point between the ends thereof and the forward end of the said reach pole 3 is pivotally connected as at 4 to a resilient member 5 which is mounted upon the front axle 1. A fifth wheel 6 is mounted upon the front axle 1 and the center of the fifth wheel is located slightly behind the said axle and in vertical alinement with the pivot 4. A hood 7 is turnably mounted upon the fifth wheel 6 and has edge portions which project down along the inner and outer sides of the said fifth wheel. A bolster 8 is mounted upon the hood 7 and is located above the front axle 1. The said bolster is provided at a point between its ends with a depending portion 9 which rests upon the front axle 1 at a point between the ends thereof.

A body spring 10 is mounted upon the bolster 8 and may be secured thereon in any suitable manner. Brace poles 11 are attached at their rear ends to the rear axle 1 at equal distances beyond the opposite sides of the reach pole 3 and the forward ends of the said brace poles converge slightly toward each other and are connected with the end portions of the bolster 8. The forward portions of the brace poles 11 are offset with relation to the rear portions thereof in order that the said forward portions may be passed over the fifth wheel 6 and the hood 7 which is turnably mounted thereon. A cross brace 13 connects the forward intermediate portions of the brace poles 11 together and the braces 14 are connected at their forward ends with the intermediate portions of the brace poles 9 and at their rear ends with the end portions of the rear axle 2. In view of the fact that the member 5 is of a resilient nature the pivot 4 which connects the member with the forward end of the reach pole 3 at all times holds the said pivot tight whereby to prevent the said pivot or the reach pole from rattling when the running gear is moving over the surface of a road.

From the foregoing description taken in connection with the accompanying drawing it will be seen that a running gear of simple and durable structure is provided and that the fifth wheel thereof is at all times protected against the accumulation of dust, dirt or mud by reason of the presence of the hood 7 over the same. As the front axle 1 turns in either of two directions, the fifth wheel 6 follows the movement of the axle while the hood 7 remains fixed with relation to the brace poles 11 and at the rearwardly disposed portion 1' thereof. In view of the fact that the said brace poles connect at their rear ends with the rear axle 2 and the reach pole 3 is similarly connected with the rear axle the structure is efficiently braced and there are ample connecting parts to cause the rear axle to follow the front axle without undue strain on any of the said connecting parts.

Having thus described the invention what is claimed is:—

A running gear comprising front and rear axles, said front axle having at a point between its ends a rearwardly disposed portion, a reach pole connected with the rear axle and pivotally connected with the rearwardly disposed portion of the front axle, a fifth wheel mounted upon the front axle and having its center in alinement with the point of pivotal connection between the reach pole and the said rearwardly disposed portion of the front axle, a hood turnably mounted upon the fifth wheel and engaging the same, a bolster mounted upon the hood and pivotally connected with the front axle at the point of pivotal connection between the said axle and the said reach pole, brace rods connected with the rear axle and the bolster at the opposite sides of the said point of pivotal connection and in advance thereof, and a transverse brace connecting the intermediate portions of the brace rods and the said reach pole together.

In testimony whereof I affix my signature in presence of two witnesses.

EUGENE MORRIS, Jr.

Witnesses:
G. R. MOORE,
E. D. BOWDEN.

Copies of this patent may be obtained for five cents each, by addressing the "Commissioner of Patents, Washington, D. C."